UNITED STATES PATENT OFFICE.

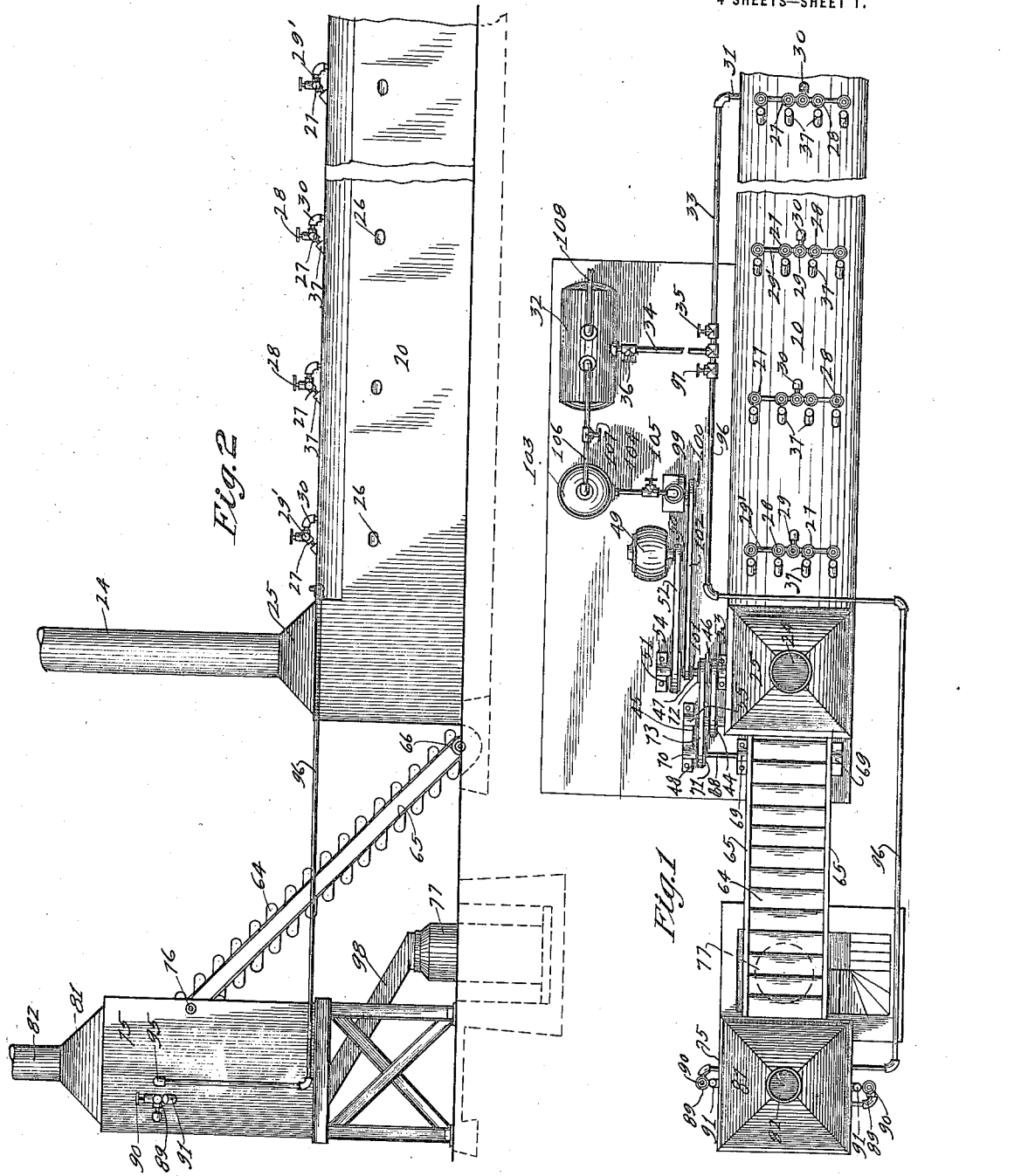

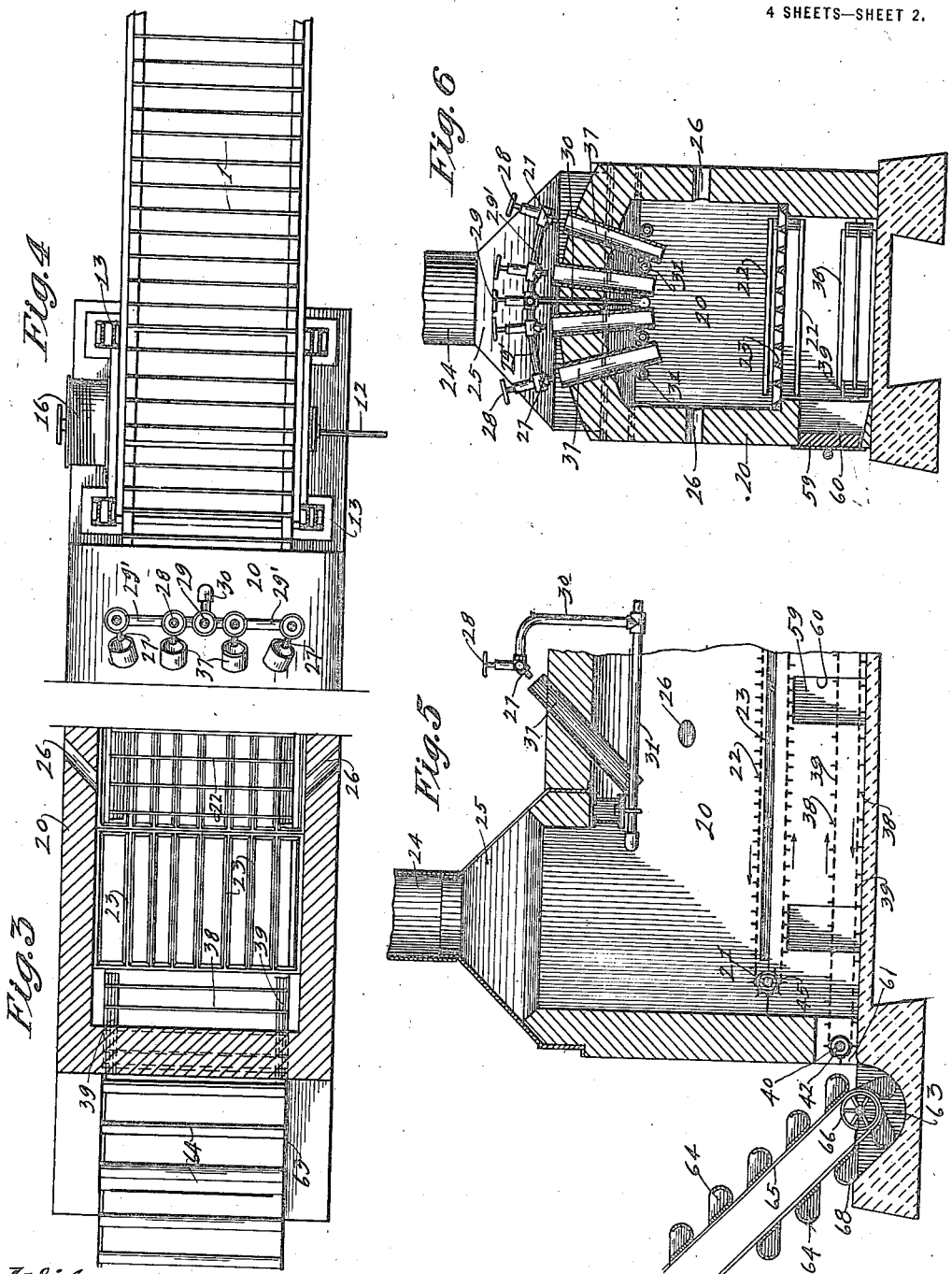

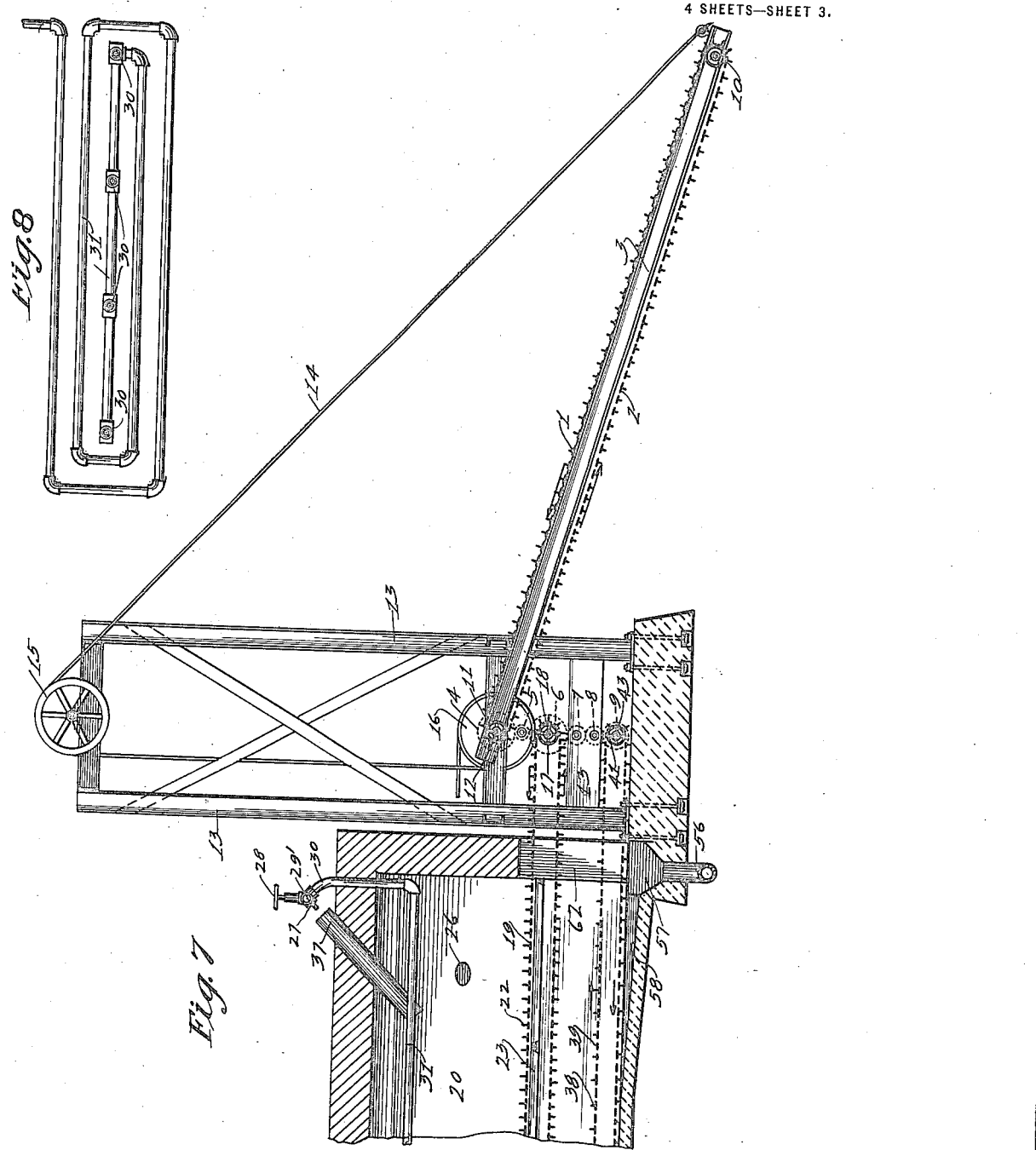

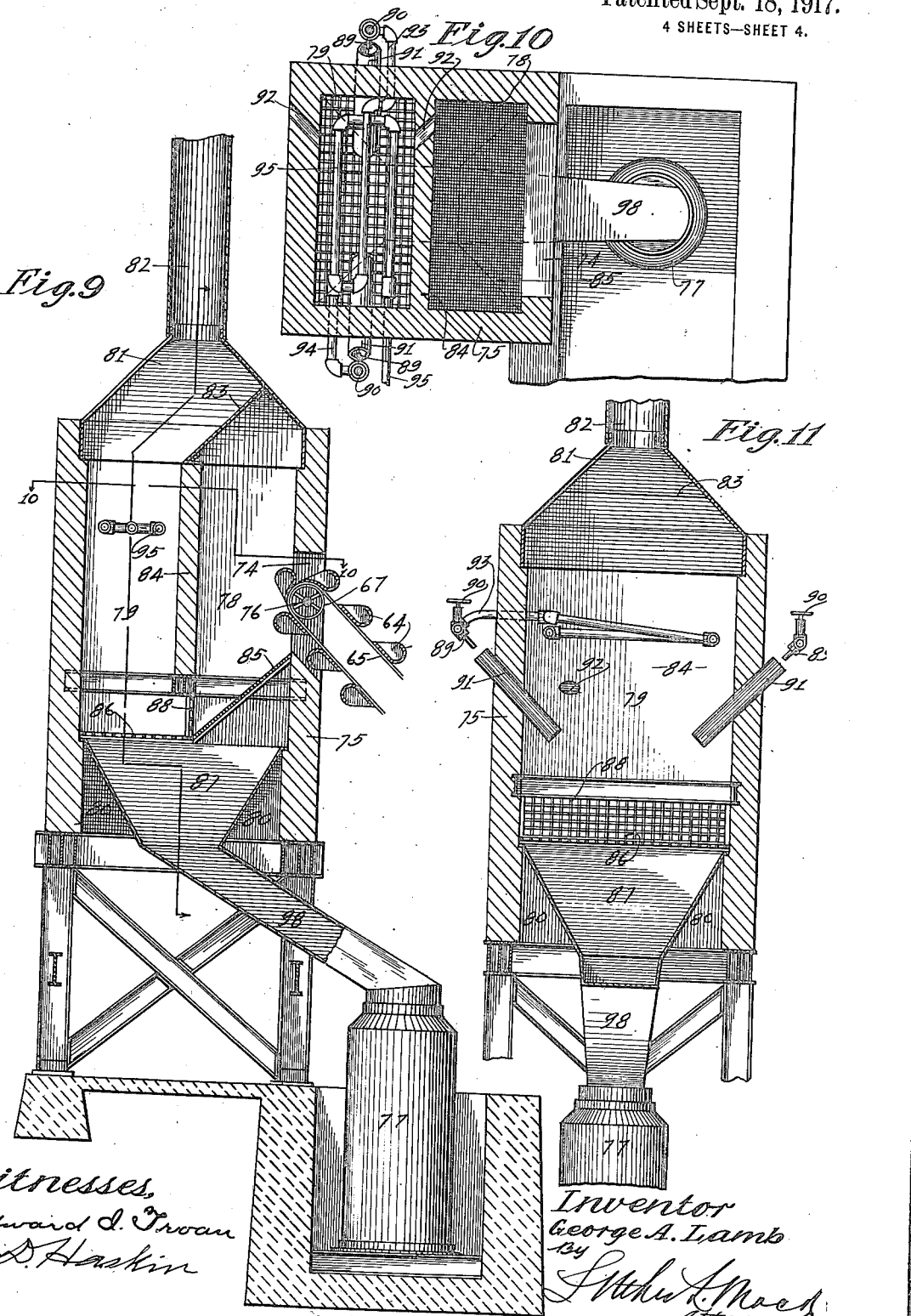

GEORGE A. LAMB, OF LOS ANGELES, CALIFORNIA.

PROCESS FOR INCINERATING KELP.

1,240,737.            Specification of Letters Patent.     Patented Sept. 18, 1917.

Application filed November 3, 1915, Serial No. 59,427. Renewed February 8, 1917. Serial No. 147,491.

*To all whom it may concern:*

Be it known that I, GEORGE A. LAMB, a citizen of the United States, residing at Los Angeles, in the county of Los Angeles and State of California, have invented a new and useful Improvement in Processes for Incinerating Kelp, of which the following is a specification.

My invention relates to processes for the incineration of kelp and other related forms of seaweed and for the reduction of the same to ashes as a preparatory step toward the extraction from the kelp of the potash and iodin which abound largely in the kelp and seaweed obtained from the waters of the ocean, and especially from the waters of the Pacific Ocean.

It has hitherto been practically impossible to extract these substances from the kelp at a profit, inasmuch as a large waste of the valuable salts usually results, especially when the kelp is allowed to dry before being incinerated, and this has been the practice in former attempts to extract the potash therefrom. Another feature of the hitherto unsuccessful methods used for this purpose consists in only a partial combustion of the dry matter and as it is not possible to extract the valuable elements from the kelp without a total combustion, a large amount of the valuable elements have been wasted.

The object of this invention, therefore, is to provide a process which will economically cause all or nearly all of the valuable salts and elements to be extracted by means of incineration of the matter in a wet state as obtained directly from the waters of the ocean, or in a dry state; and which will economize in the operation of the plant and treat the matter to be incinerated continuously from the charging of the furnace until the thoroughly incinerated matter has been delivered to the lixiviating receptacles by means of which the salts are extracted from the ashes.

The incineration of the matter is accomplished in a suitable furnace, substantially elongated and provided with several sets of burners of the Bunsen type which are supplied with gas obtained by heating gasolene which is forced through the pipes to the burners under a high and constant air pressure and oxygen is obtained from the exterior of the furnace through a plurality of port holes arranged in the sides of the furnace.

Referring to the drawings, in which similar characters of reference indicate the same parts throughout the several views, and which serve to illustrate my improved process, Figure 1 is a plan of the main and auxiliary furnace and the related mechanism; Fig. 2 is a side elevation of the same; Fig. 3 is a sectional plan of the forward portion of the main furnace; Fig. 4 is an enlarged plan of the rear portion of the same; Fig. 5 is a sectional elevation of Fig. 3; Fig. 6 is a transverse sectional elevation of Fig. 5; Fig. 7 is a sectional elevation of the rear portion of the main furnace; Fig. 8 is a plan of the fuel supply pipes as arranged within the furnace for supplying fuel to the burners; Fig. 9 is a sectional elevation of the auxiliary furnace and lixiviating tank; Fig. 10 is a plan of the same on the line 10—10; and Fig. 11 is a sectional elevation of the same at right angles to Fig. 9.

The entire plant may be erected on a suitable pier or wharf extending out into the ocean or upon the land adjacent to the water, and the kelp which is first cut from the beds by means of a mower, or otherwise is deposited upon a constantly moving conveyer 1 which is composed of transverse bars of suitable cross section in close proximity to each other and the ends of the bars are secured to links in a link belt or chain 2 which is mounted upon a derrick 3.

The conveyer 1 is operated by means of a train of gears 4, 5, 6, 7, 8 and 9 and the chains run over sprocket wheels 10 and 11 at opposite ends of the derrick. The inner end of the derrick is pivoted on a shaft 12 which is carried by a frame 13 and the outer end of the derrick is adapted to be raised and lowered to convenient operating positions by means of a cable 14 which runs over a sheave 15 revolubly mounted on the top of the frame 13 and thence downwardly over a drum 16 which may be operated for raising and lowering the derrick by an engine, or by hand.

The gear 6 operates a pair of sprockets 17 on the shaft 18 and a pair of link belts or chains 19 operate continuously through the furnace 20 over the sprockets 17 at the rear end and those 21 at the forward end of the furnace, transverse bars 22 being secured to the chains at frequent intervals, as on the derrick conveyer 1. The conveyer formed by the chains 19 and the bars 22 runs above the grates 23 which are formed in sections and rest upon ledges in the walls on opposite sides of the furnace, for the purpose of transporting the kelp which is delivered to the furnace conveyer through the furnace, and returns to the rear of the furnace beneath the grates, as shown in Fig. 5.

The furnace 20 has a suitable stack 24 and hood 25 and a row of port holes 26 are formed in the opposite walls of the furnace at suitable intervals and are disposed at angles of about 45 degrees inwardly and in the direction of the forward end of the furnace for the purpose of admitting air in large quantities to the furnace.

The burners 27 are arranged in sets of four at suitable intervals above the top of the furnace with individual valves 28 for each burner and a single valve 29 for each of the sets. The burners in each set are inter-connected by means of a pipe 29' which is connected with a vertical pipe 30 extending downwardly into the furnace and connecting with the main fuel supply pipe 31 which extends backward and forward through almost the entire length of the furnace for several times and is connected with the main fuel supply tank 32 by means of the pipes 33 and 34. A valve 35 is interposed in the pipe 33 for the purpose of regulating the supply of fuel for the entire number of burners on the main furnace, and a similar valve 36 is interposed in the pipe 34 for regulating the burners of both the main and auxiliary furnace.

Each of the burners is provided with an enlarged tube 37 which extends downwardly through the top of and into the furnace for a suitable distance at an angle of about 45 degrees in the direction of the forward end of the furnace for the purpose of directing the flame from the burners downwardly in contact with the matter carried by the conveyer and grates.

Thus the kelp is delivered from the derrick conveyer to the furnace conveyer and is carried by the latter through the furnace and in contact with flames from the burners at a relatively slow speed in order that the combustion may be complete, and oxygen from the air exterior of the tank is obtained by means of the port holes in the sides of the furnace as well as from the tubes 37 extending through the top of the furnace. When dry kelp is to be incinerated, it is obvious that the speed of the conveyer which transports it through the furnace may be increased and one or more of the burners in each set may be shut off, and under any conditions the intensity of the heat may be increased or diminished by regulating the number and volume of the sets of burners.

The ashes sift through the interstices between the transverse bars of the conveyer and through the stationary grates and are deposited upon the floor of the furnace where they are scraped up and moved forward of the furnace by means of scraper bars 38 secured to chains 39 operating on sprockets 40 and 41 on the shafts 42 and 43, respectively, at the front and rear ends of the furnace, and the chains are operated by means of a pulley 44 on the shaft 45 which is connected with and driven by a pulley 46 on the countershaft 47 and the belt 48. The sprocket 41 operates the train of gears by means of the shaft 43 and the gear 9 at the rear end of the furnace, thus transmitting motion to the derrick and furnace conveyers.

A suitable motor or engine 49 supplies the power for the entire plant and operates the countershaft 47 by means of the pulleys 50 and 51 and the belt 52. The shaft 47 is journaled in suitable bearings 53 and 54 and the shaft 40 is journaled in a similar bearing 55.

The rear end of the furnace, as shown in Fig. 7, is provided with a drain pipe 56 and sump 57 and the floor 58 of the furnace is slightly inclined toward the rear end for a short distance to permit the water to drain off which may be brought into the furnace by the kelp or which may be thrown off during the combustion thereof.

Doors 59 and openings 60 are formed in one side of the furnace just above the floor so that the floor of the furnace may be readily cleaned at intervals and any slag or uncombustible matter which may not otherwise be disposed of may be withdrawn through these doors. The front end of the furnace has an opening 61 into which the forward end of the furnace scraper chains and sprockets extend and the rear end has a substantially larger opening 62 through which both the conveyer and scraper chains extend rearwardly.

A shallow curved pit 63 of a width corresponding to the interior width of the furnace is formed at the forward end of the furnace and the ashes which are taken from the furnace floor by means of the scrapers are deposited in this pit thereby, where they are taken up by an elevating conveyer composed of elongated buckets 64 secured on and moved upwardly by a belt or chain 65 which operates on sprockets or drums 66 and 67 at the bottom and top, respectively. The sprockets or drums 66 are secured to a shaft 68 journaled in bearings 69 on opposite sides of the pit and also at its rear end in a bearing 70. The shaft 68 is driven by means of the pulleys 71 and 72 and the belt 73 from the countershaft. The upper end of the elevator extends into an opening 74 in the side of the auxiliary furnace 75 and the sprockets or drums 67 are secured to a shaft 76 which is suitably journaled at the sides of the opening.

From one or another condition encountered in the incineration of kelp, some small particles of the matter may be deposited upon the floor of the furnace before a total combustion has taken place, and it is therefore necessary to provide the auxiliary furnace 75 for insuring against these particles being delivered to the lixiviating tanks 77. The auxiliary furnace is subdivided into two upper and larger compartments 78 and 79, into the former of which the ashes and matter are delivered by the elevator through the opening 74, and a lower compartment 80 for receiving the re-incinerated ashes as well as those from the main furnace.

A hood 81 covers the top of the two upper compartments and a stack 82 extends upwardly from the hood, the compartment 78 being separated from the stack by means of a partition 83, and from the compartment 79 by means of the central partition 84. A fine mesh grate 85, which is set on an incline from the relatively larger meshed grate 86 of the furnace compartment 79 and extends upwardly to the bottom of the opening 74, forms the bottom for the compartment 78, the thoroughly incinerated ashes which are deposited on the grate by the elevator being sifted through the grate 85 into the hopper 87 therebelow, and the coarser and only partially incinerated matter being sifted through a vertical grate 88 beneath the central partition 84 into the combustion compartment 79.

A pair or more of burners 89 having valves 90 and similar to the burners on the larger main furnace are provided for the auxiliary furnace and disposed at angles and inwardly directed on opposite sides of the furnace. Tubes 91 are provided for these burners also and the air ports 92 may be suitably located in the sides or in the central partition 84, as shown, or otherwise.

The burners 89 are connected by means of pipes 93 and 94 with the pipe 95 which is extended backward and forward in the compartment 79 several times and connects with the fuel supply tank by means of the pipe 96 which has a valve 97 for regulating the supply of fuel delivered to the burners.

The auxiliary furnace insures against any partially consumed particles being deposited in the hopper 87, and all of the ashes from both of the furnaces are deposited in this hopper and are then conveyed by gravity, or otherwise, through a chute 98 into the lixiviating tank 77 which is mounted in a pit sufficiently below the level of the hopper 87 to insure a proper pitch for the chute 98 and the consequent easy delivery of the ashes thereto.

From the foregoing description of my process, it is apparent that the operation of my plant is continuous and all of the matter is handled mechanically instead of manually, thus insuring economy in operation, while the arrangement and number of the burners used provides a ready means for increasing and diminishing the heat in either of the furnaces.

It is necessary that the fuel supplied to the fuel tank should be constantly or at least frequently replenished so that the operation of the plant may not be interfered with and an ordinary form of fuel pump may be operated by the motor from the countershaft and connected with the tank for this purpose.

The fuel in the tank is forced out into the pipes and burners by air pressure supplied by an air compressor 99 which is driven by the pulleys 100 and 101 and the belt 102 from the countershaft 47; the air being stored in an air tank 103 which is connected with the compressor by a pipe 104 having a valve 105 interposed therein, and the tanks 103 and 32 being connected by the pipe 106 having the valve 107. The fuel supply pipe to the tank 32 is represented by the numeral 108 and may be connected with a pump, as described.

Having thus described my invention, what I claim as new and desire to secure by Letters Patent, is:—

1. The process for incinerating kelp which consists in moving the matter to be incinerated continuously through a primary combustion zone, heating the kelp to an incinerating temperature at intervals throughout the primary combustion zone during its passage, continuously separating the ash from the unburned material while the material is passing through said primary zone and delivering the ash and unburned material to separate receptacles, and subjecting the unburned material to further combustion.

2. The process for incinerating kelp which consists in heating the kelp to an incinerating temperature at intervals throughout a primary combustion zone, the heat being applied to the kelp at angles in the direction of movement, removing the solid products of combustion from the incinerating zone to a point separate therefrom, continuously separating the ash from the unburned material while the material is passing through said primary combustion zone, and subjecting the unburned material to further combustion, in a continuous operation.

3. The process for incinerating kelp which consists in burning liquid or gaseous fuel in an inclosed space in the presence of oxygen admitted at intervals throughout the inclosure, moving the matter to be incinerated into the presence of the burning fuel, heating the matter to an incinerating temperature at intervals throughout the primary combustion zone, removing the ash from the presence of the burning fuel and continuously separating the ash from the unburned material while the material is passing through the primary combustion zone, and subjecting the unburned material to further combustion, in a single and continuous operation.

4. The process for incinerating kelp which consists in burning liquid or gaseous fuel in a primary combustion zone in the presence of oxygen, heating the material to an incinerating temperature at intervals throughout the primary combustion zone, said material being moved continuously during the application of the heat, continuously separating the ash from the unburned material while the material is progressing through said primary combustion zone, removing the ash therefrom to an auxiliary combustion zone, subjecting the ash to further combustion in said auxiliary combustion zone, and collecting the ash for further treatment.

5. The process for incinerating kelp which consists in forcing liquid fuel under pressure through a primary combustion zone, volatilizing and burning the fuel at separate points throughout the length of said zone in the presence of oxygen, continuously moving the matter to be incinerated through the presence of the burning fuel, heating the matter to an incinerating temperature at intervals throughout said primary combustion zone, continuously separating the ash from the unburned material while the material is progressing through said primary combustion zone, removing the ash and unburned material from said primary zone, and subjecting the unburned material to further combustion.

6. The process for incinerating kelp which consists in forcing liquid fuel under pressure through a heated inclosure and burning the fuel therein, supplying oxygen from the exterior of the inclosure at points adjacent to the admission of the fuel for mixture therewith, continuously moving the material through the presence of the burning fuel, heating the material to an incinerating temperature at intervals throughout a primary combustion zone, continuously separating the ash from the unburned material while the material is passing through the primary combustion zone, removing the ash from said primary combustion zone, and subjecting the unburned material to further combustion, for insuring the total incineration of the combustible matter, in a continuous operation.

7. The process for incinerating kelp which consists in forcing liquid fuel under pressure through and burning the fuel in a heated inclosure in the presence of oxygen, the oxygen being admitted at intervals through the sides of the inclosure, continuously moving the matter to be incinerated through the presence of the burning fuel in a primary operation, heating the material to an incinerating temperature at intervals throughout a primary combustion zone during the continuous movement thereof, continuously separating the ash from the unburned material while the material is progressing through said primary combustion zone, removing the ash and unburned material to separate points remote from said primary combustion zone, and subjecting the unburned material to further combustion, in a single operation.

8. The process for incinerating kelp which consists in forcing liquid fuel under pressure into the presence of heat, volatilizing and burning said fuel in the presence of oxygen, moving the body of combustible material continuously in a horizontal plane through the presence of the burning fuel, heating the material to an incinerating temperature at intervals throughout the primary combustion zone, removing the solid products of combustion consisting of ash and unburned material from said primary combustion zone to points remote therefrom, separating the ash from the unburned material continuously while the material is progressing through said primary combustion zone, and subjecting the unburned material to further combustion, in a single operation.

9. The process for incinerating kelp which consists in volatilizing liquid fuel, forcing the same under air pressure into and burning the same in the presence of oxygen, continuously moving the material horizontally through the presence of the burning fuel in a primary combustion zone, continuously sifting and separating the ash from the unburned material while the material is moving through said primary combustion zone, heating the material to an incinerating temperature at intervals during its passage through said primary combustion zone, removing and elevating the solid products of combustion from the presence of the burning fuel, separating the combustible from the non-combustible material thus removed, reincinerating the combustible material thus separated, and removing the material from the presence of the fuel, in a single operation.

10. The process for incinerating kelp which consists in burning fuel at a plurality of horizontally alined points in the presence of oxygen admitted thereto, subjecting the material to the action of heat in a primary and a secondary combustion zone, continuously moving the material through said primary zone, heating the material to an incinerating temperature at intervals throughout said primary zone, separating the ash from the unburned material continuously during the movement thereof through said primary zone, subjecting the unburned material to further combustion in said secondary zone, for eliminating all of the combustible matter, and collecting the solid products of combustion for further use, in a continuous operation.

11. The process for incinerating kelp which consists in burning pre-heated liquid fuel under air pressure in the presence of oxygen in a primary and a secondary combustion zone, heating the material to an incinerating temperature at intervals throughout said primary combustion zone, separating the solid products of combustion into ash and unburned material while the material is progressing through said primary combustion zone, and collecting all of the solid products of combustion after the secondary incineration.

12. The process for incinerating kelp which consists in burning fuel in the presence of oxygen and forcing the fuel under pressure into the presence thereof, introducing the oxygen from an exterior source into the presence of the fuel, continuously moving the material into and from contact with the burning fuel, heating the material to an incinerating temperature at intervals throughout a primary combustion zone, continuously separating the solid products of combustion into ash and unburned material while the material is progressing through the primary combustion zone, reincinerating in a separate combustion zone any resulting combustible solid matter, and collecting the solid products of combustion.

13. The process for incinerating kelp which consists in heating and burning liquid fuel under pressure in an inclosure, admitting oxygen into the presence of and mixing the same with the burning fuel at different points about the inclosure, continuously moving the material through the inclosure in contact with the burning fuel, heating the material to an incinerating temperature at intervals during its passage therethrough, continuously sifting and separating the ash from the unburned material while the material is progressing through said inclosure, removing the solid products of combustion from the inclosure, subjecting the matter thus removed to further combustion in a separate inclosure, and collecting all of the solid products of combustion for further use.

14. The process for incinerating kelp which consists in forcing liquid fuel under pressure through a heated inclosure and into a primary combustion zone, admitting oxygen from the atmosphere to the presence of the burning fuel and burning the same therewith, continuously moving the material through said primary combustion zone, heating the material to an incinerating temperature at intervals during its movement therethrough, separating the solid from the gaseous products of combustion, continuously separating the ash from the unburned material while the material is moving through said primary combustion zone, continuously removing and elevating the solid products of combustion as they may be accumulated to a final combustion zone, subjecting the unburned material to the heat in said final combustion zone, disposing of the ash and unburned material adjacent to said final combustion zone at different points, and collecting all of the solid products of combustion after the final combustion.

15. The process for incinerating kelp which consists in burning fuel in the presence of oxygen in a primary and final combustion zone, continuously moving the material through said primary combustion zone, heating the material to an incinerating temperature at intervals throughout said primary combustion zone, separating the ash from the unburned material during the movement of the material therethrough, moving the unburned material to said final combustion zone, heating said unburned material therein to an incinerating temperature, sifting the ash from the products of combustion, and collecting all of the solid products of combustion for further use.

Signed at Los Angeles, in the county of Los Angeles and State of California, this 16th day of September, 1915.

GEORGE A. LAMB.

Witnesses:
EDWARD I. TROAN,
ANNE HARTENSTEIN.